United States Patent [19]

Hanse

[11] Patent Number: 5,173,745
[45] Date of Patent: Dec. 22, 1992

[54] CLUSTER DITHER APPARATUS

[75] Inventor: Joel G. Hanse, Edina, Minn.

[73] Assignee: Honeywell Inc., Minneapolis, Minn.

[21] Appl. No.: 684,613

[22] Filed: Apr. 12, 1991

[51] Int. Cl.⁵ .............................................. G01C 19/70
[52] U.S. Cl. ..................................... 356/350; 372/94
[58] Field of Search ............... 356/350, 349, 359, 360, 356/357; 250/227.11

[56] References Cited

U.S. PATENT DOCUMENTS

| | | | |
|---|---|---|---|
| 3,503,688 | 3/1970 | Lechevalier | 356/106 |
| 4,309,107 | 1/1982 | McNair et al. | 356/350 |
| 4,349,183 | 9/1982 | Wirt et al. | 267/160 |
| 4,597,667 | 7/1986 | Curby et al. | 356/350 |
| 4,653,918 | 3/1987 | Stjern et al. | 356/350 |
| 4,710,027 | 12/1987 | Fersht et al. | 356/350 |
| 4,711,575 | 12/1987 | Butler | 356/350 |
| 4,751,718 | 6/1988 | Hanse et al. | 372/94 |
| 4,801,206 | 1/1989 | Benoist | 356/350 |
| 4,856,901 | 8/1989 | Ferriss et al. | 356/350 |

OTHER PUBLICATIONS

Marketing Brochure "Trilag Third Generation RLG" Kearfott division of Singer Company.

Primary Examiner—Samuel A. Turner
Assistant Examiner—LaCharles P. Keesee, II
Attorney, Agent, or Firm—Craig J. Lervick

[57] ABSTRACT

A dither motor for dithering a plurality of inertial sensors includes an outer support ring, a plurality of reeds and a plurality of mounting supports. The outer support ring may be generally circular or polygonal in shape. Each reed of the plurality of reeds has a hub end and an outer end wherein the hub ends are connected to a common hub and the ring ends are connected to the outer support ring. The plurality of reeds are arranged to be disposed at equal angles from each other and extend radially outwardly from the hub. The plurality of mounting supports extend outwardly from the hub and each mounting support is located between two of the plurality of reeds. The mounting supports are also equally spaced apart. Further, each reed has a means for oscillating connected thereto such as piezoelectric elements.

18 Claims, 2 Drawing Sheets

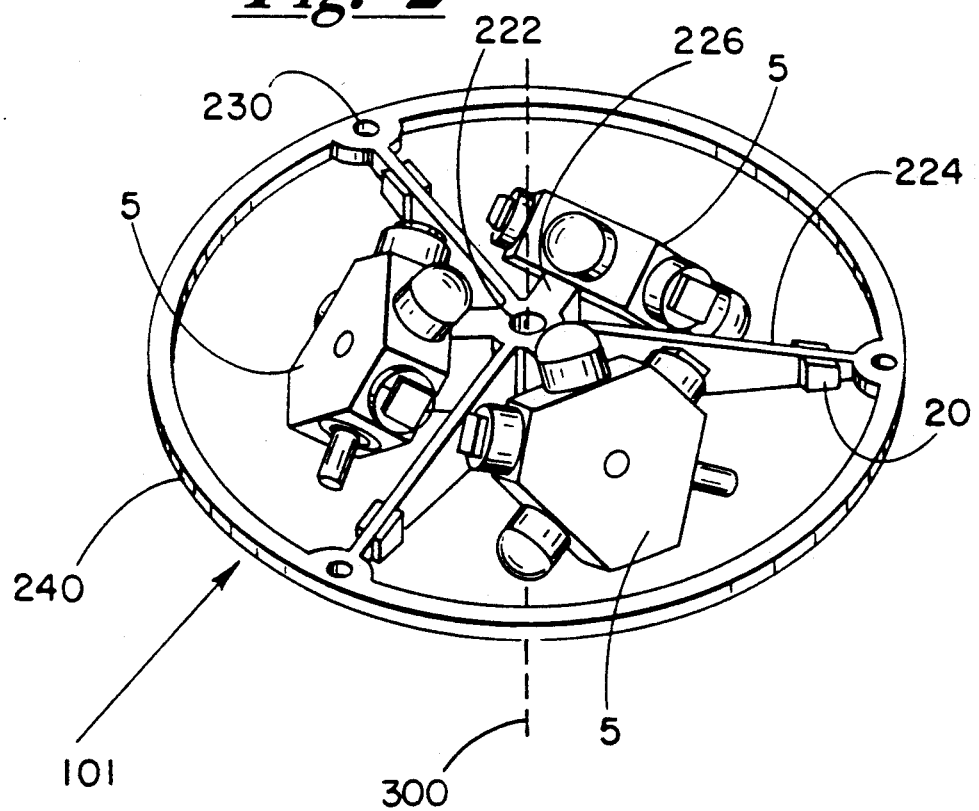

CLUSTER DITHER APPARATUS

FIELD OF THE INVENTION

This invention relates generally to rotation sensors and particularly to ring laser gyroscope rotation sensors. Still more particularly, this invention relates to apparatus for dithering a plurality of ring laser gyroscopes using a common dither motor to reduce lock-in effects.

BACKGROUND OF THE INVENTION

Ring laser angular rate sensors are well known. One example of a ring laser angular rate sensor is Hanse, et al U.S. Pat. No. 4,751,718, which is incorporated herein by reference thereto. Present day ring laser angular rate sensors, commonly known as ring laser gyros, include a thermally and mechanically stable laser block having a plurality of formed cavities for enclosing a gap. Mirrors are placed at the extremities of the cavities for reflecting laser beams and providing an optical close-looped path.

Associated with such sensors is a phenomenon called lock-in which has been recognized for some time in the prior art and has been solved by rotationally oscillating a sensor. Conventionally, a piezoelectric actuator is connected to a suspension system which causes the block of the sensor to oscillate angularly at the natural mechanical resonant frequency of the suspension system. This dither motion is superimposed upon the actual rotation of the sensor in inertial space. The prior art includes various approaches to recover inertial rotation data free from dither effects.

Dither suspension mechanisms in the prior art are typically directed toward dithering a single ring laser gyro with a single dedicated dither motor imbedded in the hub of each ring laser gyro. Examples of such systems include Stjern, et al. U.S. Pat. No. 4,653,918 and Wirt, et al. U.S. Pat. No. 4,349,183, as well as the Hanse ring laser gyro.

Dither motors for dithering multiple ring laser gyro beams within an integral ring laser gyro block are also known. For example, LeChevalier U.S. Pat. No. 3,503,688, entitled "Multiple Axis Laser Angular Rate Sensor", discloses a solid block support apparatus which supports three sets of counter rotating laser beams. A shaft and block are vibrated or dithered about the axis of the shaft by a single mechanical dithering means. Components of the dither are presented to each triangular path and all three of the triangles are simultaneously dithered.

U.S. Pat. No. 4,856,901 to Ferris, et al., entitled "Velocity Control System Using Piezoelectric Transducers", discloses a design strikingly similar to the dither concept used in the LeChevalier '688 patent. Three ring laser gyro paths integrated into a solid block are mechanically dithered by a single dither mechanism through a cube diagonal. The present invention, in contrast, is a device for simultaneously dithering three discrete ring laser gyros each of polygonal shape and does not require an integrated solid block construction as in the '688 patent. Thus, the present invention allows the construction of smaller ring laser gyro packages using discrete ring laser gyros. This avoids the complexities and expense of fabricating a single three gyro block.

Other art provides various dither schemes. U.S. Pat. No. 4,801,206, to Benoist, entitled "Simplified Ring Laser Gyroscope Dither Control and Method", is also directed to a dither mechanism. A dither flexor is mounted between a ring laser gyroscope body and a support such that the ring laser gyroscope may be dithered to have angular oscillations about a sensing axis.

U.S. Pat. No. 4,711,575, to Butler, entitled "Non-pendulous Counter-Balance Dither Mechanism For Laser Gyro", discloses a laser gyro dither mechanism utilizing a three spring suspension system.

U.S. Pat. No. 4,710,027 to Fersht, et al., entitled "Method and Apparatus for Mechanical Dither Stabilization Of A Laser Angular Sensor", discloses an apparatus whereby one, two, three or four dither mechanisms selectively may be simultaneously energized. The '027 patent is directed to individual dithering means connected to each of at least three ring laser gyros which are selectively energized. This is different from the present invention in that the present invention comprises a single dither mechanism which simultaneously dithers multiple ring laser gyros.

U.S. Pat. No. 4,653,918 to Stjern, et al., entitled "Low Q Body-Dithered Laser Gyro Assembly", discloses a low Q ring laser gyro dither motor assembly.

U.S. Pat. No. 4,597,667 to Curby, et al., entitled "Dither Controller For Ring Laser Angular Rotation Sensor", discloses a dithering apparatus which is inserted into the hub of a ring laser gyro. The mechanism includes a pickoff sensor to measure parameters relating the sensor body position to a support means.

U.S. Pat. No. 4,349,183 to Wirt, et al., entitled "Spring For A Ring Laser Gyro Dither Mechanism", discloses a flexure spring assembly for a ring laser gyro dither mechanism using flexure springs between the hub and the rim. Each spring is driven by four piezoelectric crystal wafers.

U.S. Pat. No. 4,309,107 to McMere, et al., entitled "Laser Gyro Dither Mechanism", discloses a laser gyro dither mechanism utilizing a three-spring suspension system.

The cluster dither mounting apparatus provided by the instant invention offers significant advantages over the prior art schemes. One advantage is that the invention allows the fabrication of inertial measurement units in a package volume which is smaller than the packaging volume generally available with prior art schemes. Further, there is only a single dither motor in the system hardware and software elements are simplified. As a result, the cost of such units built in accordance with the present invention is low. For example, the packaging volume in one application of the invention fits a 3.7 inch diameter $\times 2$ inch length.

SUMMARY OF THE INVENTION

The present invention provides a dither motor for dithering a plurality of inertial sensors. The dither motor includes an outer support ring, a plurality of reeds and a plurality of mounting supports. The outer support ring may be circular or polygonal in shape. Each reed of the plurality of reeds has a hub end and an outer end wherein the hub ends are connected to a common hub and the ring ends are connected to the outer support ring. The plurality of reeds are advantageously arranged to be disposed at equal angles from each other and extend radially outwardly from the hub. The plurality of mounting supports extend outwardly from the hub and each mounting support is located between two of the plurality of reeds. The mounting supports are also advantageously equally spaced apart.

Further, each reed has a means for oscillating connected thereto.

In one aspect of the invention, the outer support ring comprises a substantially triangular shape.

In yet another aspect of the invention the plurality of reeds are tapered such that the hub end has a first height and the outer end has a second lesser height. In one particular embodiment of the invention, the first height is greater than the second height.

In yet another aspect of the invention, the dither motor as provided by the invention has at least three radial reeds.

In yet another aspect of the invention, the means for oscillating are piezoelectric elements affixed to each of the plurality of reeds. Other objects, features and advantages of the present invention will become apparent to those skilled in the art through the Description of the Preferred Embodiment, claims, and Drawings herein wherein like numerals refer to like elements.

BRIEF DESCRIPTION OF THE DRAWINGS

FIG. 2 shows, in detail, one alternate embodiment of the cluster dither motor of the invention including a plurality of ring laser gyros attached thereto.

DETAILED DESCRIPTION OF THE PREFERRED EMBODIMENT

Figure 1:
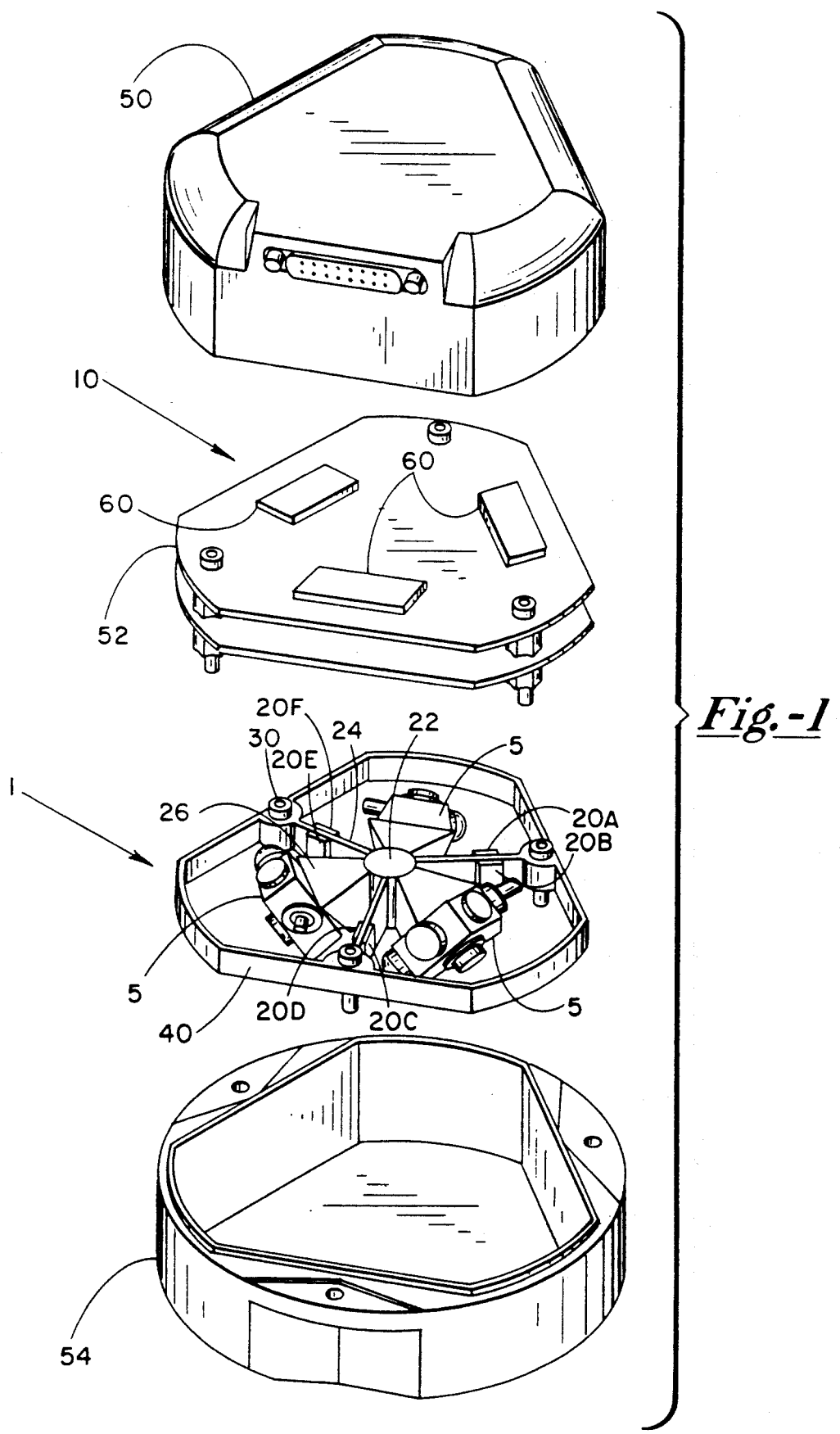
FIG. 1 schematically shows an exploded view of an inertial reference apparatus including the cluster dither motor as provided by one aspect of the invention.

FIG. 1 is an exploded view of an inertial measurement apparatus including the cluster dither motor of the invention. The inertial measurement apparatus 10 includes a cover 50, printed circuit boards 52, cluster dither motor apparatus 1, and housing 54. The housing and cover may comprise a substantially polygonal shape as, for example, a substantially triangular shape or a substantially square shape. Alternatively, the housing and cover, together with the other elements may be fabricated in a circular or similarly rounded shape, such as an ellipsoid. The housing 54 and cover 50 may typically be comprised of metal. The printed circuit boards 52 may advantageously include circuit elements well known in the art for operating an inertial measurement unit.

The cluster dither motor 1 comprises an outer support ring 40, a plurality of springs or reeds 24, a hub 22 and a plurality of mounting supports 26. Fastened to each of the plurality of reeds 24 by well known means, such as epoxy or glue or equivalent fastening mechanisms, are means for oscillating 20. The means for oscillating 20 may be, for example, piezoelectric elements 20A-20F.

The piezoelectric element 20A, for example, is poled such that application of a driving signal across it causes the piezoelectric element to selectively expand or contract. The piezoelectric element 20B is also poled and has a pair of opposing electrodes (not shown) connected thereto. The piezoelectric elements 20A and 20B may have opposite polarities so that application of the same driving signal thereto causes one element, for example element 20A, to expand while the other element 20B contracts. If the elements 20A and 20B have the same polarities, then the driving voltages must have opposite polarities in order to achieve the desired effect of alternately expanding and contracting. The piezoelectric elements 20C, 20D, 20E and 20F have polarities and driving voltages substantially identical to the piezoelectric elements 20A and 20B, respectively. Therefore, if the piezoelectric elements 20A, 20C and 20E contract while the piezoelectric elements 20B, 20D and 20F expand, reeds 24 will deform so that the dither motor 1 rotates about the hub 22. A change in sign of the driving signal causes an opposite direction rotation of the dither motor. Shown attached to each of the plurality of the mounting means 26 are a plurality of ring laser gyros 5. The ring laser gyros 5 may be of the type as described in U.S. Pat. No. 4,751,718 which is assigned to the same assignee as the present invention. The ring laser gyros are advantageously polygonal in shape and may typically have square or triangular blocks.

Referring now to FIG. 2, an alternate embodiment of the invention is shown having a generally circular shape. It will be understood by those skilled in the art that the cluster dither motor need not be a circular shape in order to function. The cluster dither motor of the invention 101 shown in FIG. 2 comprises an outer support ring 240, a hub section 222, supports 226, oscillating means 20 and a plurality of radially extending reeds 224. In one aspect of the invention employing at last three ring laser gyros 5, the plurality of support reeds 224 may advantageously be three equally spaced reeds. Each of the reeds have a hub end and an outer support end. The reeds are attached at their hub ends at the hub 222 and are equally spaced and project radially outward to the outer support ring 240 where they are attached at their outer ends at junctions which advantageously include mounting holes 230. The reeds are tapered radially so as to have a first height at the hub end and a second, lesser height at the junction with the support ring. The ratio of the first height to the second height depends upon the amount of thrust to be experienced along a thrust axis 300 which runs perpendicularly through the center of the hub section 222. In one example of the invention designed for a thrust of 100,000 g's along the thrust axis, the first height was advantageously made approximately 5 times greater than the second height. Those skilled in the art with the benefit of the instant disclosure will appreciate that a typical ratio of the first to second end is advantageously at least 2:1.

In operation, electrical leads (not shown) are attached from the ring laser gyro electronics 60 and printed circuit boards 52 to the piezoelectric elements 20 to cause the plurality of reeds to oscillate or dither. The dithering motion is then passed through the supports 226 onto the ring laser gyros 5, thereby preventing the ring laser gyro "lock-in" condition.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A dither motor for dithering a plurality of inertial sensors wherein the dither motor comprises:
   (a) an outer support ring;
   (b) a plurality of reeds, each reed having a hub end and an outer end wherein the hub ends are connected to a common hub and the outer ends are connected to the outer support ring wherein the plurality of reeds are arranged to be disposed at equal angles from each other extending radially outwardly from the hub and wherein each reed has a means for oscillating connected thereto; and (c) a plurality of mounting supports extending outwardly from the hub wherein each mounting support is located between two reeds.

2. The dither motor of claim 1 wherein the outer support ring has a substantially polygonal shape.

3. The dither motor of claim 2 wherein the hub end has a first height and the ring end has a second height the plurality of reeds are tapered such that the first height is greater than the second height.

4. The dither motor of claim 3 wherein the plurality of reeds comprises at least three reeds.

5. The dither motor of claim 4 further including at least three ring laser gyros wherein each ring laser gyro is mounted to the one of the plurality of the mounting supports.

6. The dither motor of claim 5 wherein the means for oscillating comprises a piezoelectric element.

7. The dither motor of claim 1 wherein the outer support ring has a substantially circular shape.

8. In an inertial measurement unit an improved sensing and dither motor apparatus comprising:

(a) means for dithering a plurality of inertial sensors wherein the dither means comprises an outer support ring, a plurality of reeds, each reed having a hub end and an outer end wherein the hub ends are connected to a common hub and the outer ends are connected to the outer support ring wherein the plurality of reeds are arranged to be disposed at equal angles from each other extending radially outwardly from the hub and wherein each reed has a means for oscillating connected thereto, and a plurality of mounting supports extending outwardly from the hub wherein each mounting support is located between two reeds; and (b) wherein the dither means outer support ring has a substantially polygonal shape.

9. The apparatus of claim 8 wherein the hub end has a first height and the ring end has a second height and the plurality of reeds are tapered such that the first height is greater than the second height.

10. The apparatus of claim 9 wherein the plurality of reeds is at least three reeds.

11. The apparatus of claim 10 further including at least three ring laser gyros wherein each ring laser gyro is mounted to the one of the plurality of the mounting supports.

12. The apparatus of claim 11 wherein the means for oscillating comprises a piezoelectric element.

13. In an inertial measurement apparatus, including a plurality of discrete ring laser angular rate sensors, an improved dithering apparatus comprising means for simultaneously dithering each of the plurality of discrete laser gyros wherein the dithering means includes an outer ring which surrounds the plurality of gyros, the dithering means further includes a plurality of mounting surfaces, and each of the gyros are mounted to one of the mounting surfaces.

14. The apparatus of claim 13 wherein the dither means comprises:

(a) a plurality of reeds, each reed having a hub end and an outer end wherein the hub ends are connected to a common hub and the outer ends are connected to the outer ring wherein the plurality of reeds are arranged to be disposed at equal angles from each other extending radially outwardly from the hub and wherein each reed has a means for oscillating connected thereto.

15. The apparatus claim 14 wherein the outer ring has a substantially polygonal shape.

16. The apparatus of claim 15 wherein the hub end has a first height and the ring end has a second height the plurality of reeds are tapered such that the first height is greater than the second height.

17. The apparatus of claim 16 wherein the plurality of reeds is at least three reeds.

18. The apparatus of claim 17 wherein the means for oscillating comprises a piezoelectric element.

* * * * *